United States Patent Office 2,814,496
Patented Nov. 26, 1957

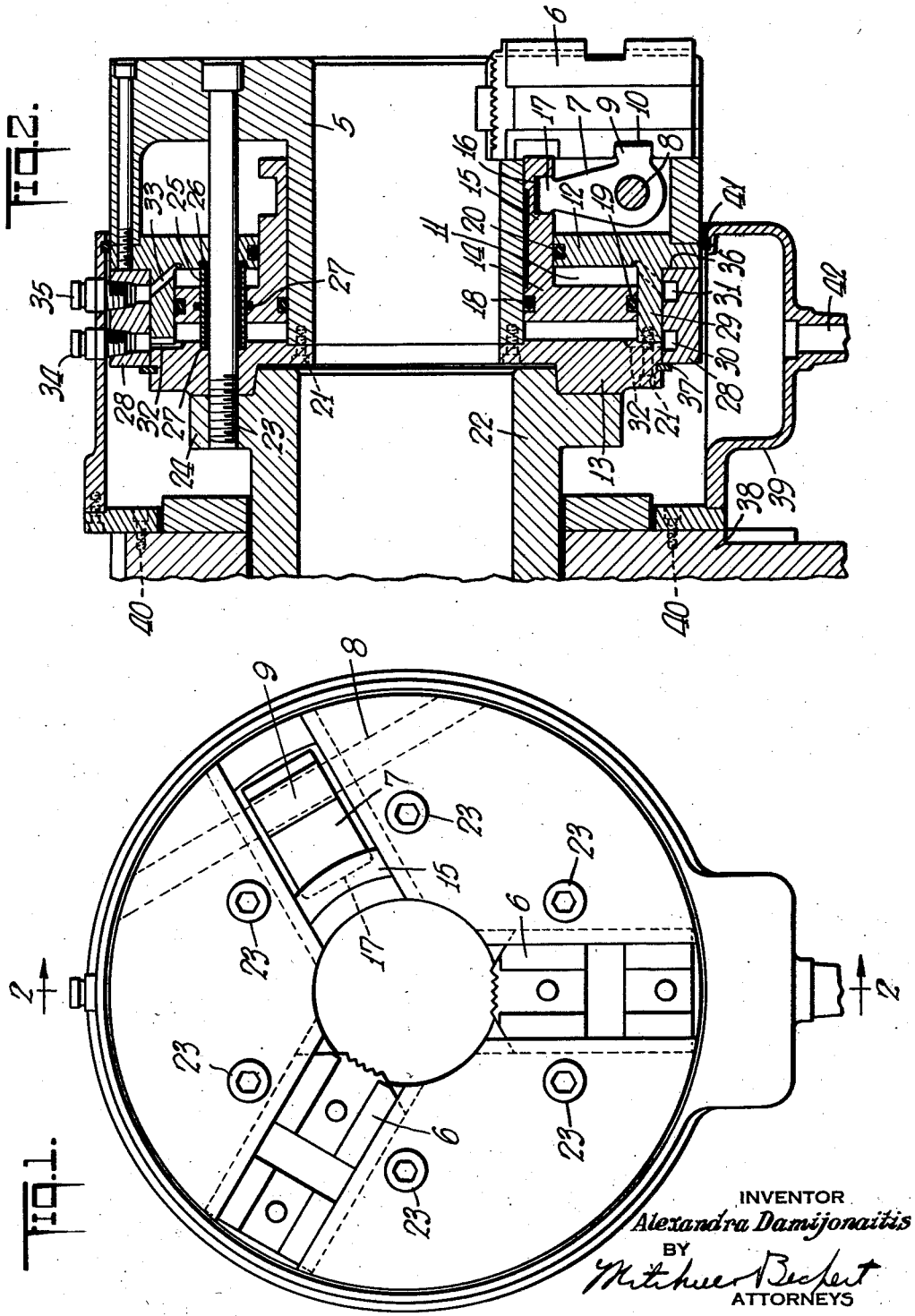

2,814,496

FLUID ACTUATED CHUCK

Alexandra Damijonaitis, New Britain, Conn., assignor to Union Manufacturing Company, New Britain, Conn., a corporation of Connecticut Application August 23, 1954, Serial No. 451,614

4 Claims. (Cl. 279—4)

My invention relates to a power chuck, and more particularly to a power chuck having a piston and cylinder means carried by the chuck body so as to be unit handling therewith.

It is an object of the invention to provide an improved power chuck embodying a fluid pressure actuated means unitarily assembled with the chuck and severing to actuate the jaws thereof, all of said parts being unit handling.

It is another object to provide a power chuck which will be direct acting and in which all parts will be accurately balanced.

Another object is to provide a chuck having fluid pressure actuated means for operating the same and means for catching any drip or leakage of pressure fluid escaping from the fluid pressure actuating means.

It is another object to provide an improved power chuck having an annular type piston concentrically arranged in the chuck and arranged to operate the jaws of the chuck, all of said parts being unitarily assembled.

Other objects and various features of novelty and invention will be hereinafter pointed out or will become apparent to those skilled in the art.

In the drawings, which show, for illustrative purposes only, a preferred form of the invention:

Fig. 1 is a front view in elevation of a chuck and associated parts embodying features of the invention, parts being broken away to illustrate interior construction; and Fig. 2 is a sectional view taken substantially in the plane of the line 2—2 of Fig. 1.

Briefly stated, in a preferred form of the invention, I provide a chuck body having cylinder and piston means therein concentric with the chuck body. The movable member of the cylinder and piston means is connected to the jaws, preferably through actuating levers for moving the jaws. The movable member of the piston and cylinder means is fluid pressure actuated. The chuck body, together with the fluid pressure actuated means, are preferably arranged for unit handling. I provide shroud or housing means to cooperate with the chuck, so that leakage or drip of pressure fluid, such as oil, may be caught and conducted away.

In the form illustrated, I provide a chuck body 5 having a plurality—in this case, three—chuck jaws 6 mounted for radial reciprocation in the body in the usual or any desired fashion. The jaws are preferably lever actuated, and I provide a lever 7 for each jaw. Each lever 7 is journaled on or about a shaft 8 secured in the chuck body. Each lever has a short leg 9 which cooperates with a slot or notch 10 in the jaw 6, so that, as the lever 7 is rocked about its axis 8, the jaw 6 will be moved in or out.

The levers 7 are actuated by fluid pressure actuated means. In the form shown, the fluid pressure actuated means comprises a piston and cylinder means carried by the chuck body and unit-handling therewith. As illustrated, the chuck body has a cylinder 11 formed therein and is limited in the forward direction by the wall 12 of the body and in the rearward direction by the back plate 13 of the chuck body. A piston 14 is movable in the cylinder 11 and has an extension or what may be termed a piston rod in the form of a sleeve 15 projecting forwardly into the chuck body. This forward projection or piston rod is provided with a circumferential groove 16 therein for receiving the ends of the long legs 17 of the levers 7. Thus, when the piston 14 is reciprocated, the levers 7 are rocked and the jaws 6 are moved back and forth radially in the chuck body.

The piston and piston rod are preferably packed or sealed, as by means of seals 18, 19, and 20, so that there is little or no fluid leakage in or from the cylinder. The back plate 13 of the chuck, which, as stated, forms the rear or head end of the cylinder 11, is secured to the chuck body, as by means of screws 21, and all of the parts referred to are unit handling.

The chuck is designed to be secured to any standard or desired spindle 22, as by means of screws or the like 23, which extend from the front of the chuck body through the piston and cylinder means heretofore described and into the flange 24 of the spindle, as will be clear. A plurality of such screws 23 are employed and, in order to provide for relatively free movement of the piston 14 in the cylinder, I provide means for freely passing screws 23 through the movable member of the cylinder and piston means.

In the form illustrated, there is a tube 25 loosely surrounding each screw 23 and engageable with both the cylinder and the piston. Each tube 25 may fit in a shallow bore 26 in the chuck body proper and 27 in the back plate 13 of the chuck body. This tube 25 is, in the form illustrated, packed in the cylinder and back plate to prevent leakage, and the piston slides rather freely on the tube 25 and is sealed as by means of the seal 27 surrounding the tube 25. Thus, the chuck may be securely held in place on the spindle and at the same time the piston may have relatively free movement in the cylinder without in any way interfering with or being interfered with by the screws 23, as will be clear.

Pressure fluid is conducted to and from the cylinder and piston means, preferably by non-rotating means, whereby joints and leakage may be reduced to a minimum. In the form illustrated, I employ a relatively fixed or non-rotatable ring 28 which surrounds part of the wall 29 of the cylinder and has a running fit thereon. This fluid pressure conducting ring 28 has annular passages 30—31 therein and the cylinder, in the form shown, has passages 32—33 connecting the annular passages 30—31, with the interior of the cylinder at opposite sides of the piston 14 therein. The ring 28 has fluid pressure conducting fittings 34—35, which communicate with the annular passages 30—31, so as to conduct fluid pressure to and from such annular passages. The fluid pressure is admitted and exhausted from the ends of the cylinder 11 successively by means of any suitable valve arrangement, now well known in the art, and connected to the connection means 34—35.

The fluid pressure conducting ring 28 has rather a tight running fit on the cylinder part 29 and on a part of the back plate 13 of the chuck body, and is held in proper longitudinal position as by means of the shoulder 36 and the snap ring 37.

Since there is likely to be some leakage of pressure fluid such as oil from the various passages, I prefer to provide means to confine the leakage such as a sealed type end fitting or a housing or shroud so as to catch and collect any escaping pressure liquid and conduct the same away. In the form illustrated, the machine frame 38 which carries the spindle 22 may carry the shroud or housing 39, which may be secured thereto as by means of screws 40—40. The shroud extends forwardly in the form shown to about the middle of the chuck and therefore encloses the rear portions, where leakage is most likely to occur. If desired, the housing or shroud may have a packing 41. Thus, as the chuck rotates, any pressure liquid leaking from the chuck and possibly thrown outwardly will be caught by the housing or shroud 39 and will find its way to the drip connection 42, as will be clear.

It will be understood that, when pressure fluid is admitted through passage 33 to the tail end of the cylinder 11, piston 14 will be moved rearwardly and will rock the levers so as to move the jaws toward the "closed" position. When pressure fluid is exhausted from the tail end of the cylinder 11 and admitted to the head end thereof, the piston will be moved toward the front of the chuck and rock the levers so as to move the jaws toward the "open" position.

It will be seen that the total pressure in the tail end of the cylinder and therefore acting on the piston will be somewhat less than the total pressure acting on the head end of the piston, and therefore there is always an excess of pressure for opening the chucks.

All of the parts are relatively simple to construct. All parts are concentrically arranged so that the entire chuck and all of its rotating parts will be in balance and all of the jaws, being actuated by a single means, will always move in unison and provide proper chucking action. The entire chuck and all of its parts are unit handling and, therefore, there are no pipes or passages which have to be arranged at the rear of the spindle, as is often the case with other power actuated chucks. Any slight leakage that might occur will be taken care of by the shroud or housing so that the chuck will be clean and will not throw oil during operation.

While the invention has been described in detail and a preferred form illustrated, it will be understood that various changes and modifications may be made within the scope of the invention as defined in the appended claims.

I claim:

1. In a chuck, a chuck body, chuck jaws thereon, a cylinder and piston in said body, means for securing said chuck body to a spindle and comprising a screw passing through said cylinder and piston, a tube loosely surrounding said screw, one of said cylinder and piston members having movable sealing engagement with said tube and the other of said cylinder and piston members having a fixed sealing engagement with said tube, and means connecting the movable member of said piston and cylinder members and said jaws for moving the latter.

2. In a chuck, a chuck body, chuck jaws thereon, a screw passing through said body for securing the same to a spindle, said body having a cylinder and piston therein having openings for the passage of said screw, said cylinder having a tube loosely surrounding said screw and sealed at the ends in said cylinder, a packed sliding joint between said piston and said tube, for the purpose set forth, and means connecting said piston and said jaws for moving the latter.

3. In a power chuck, a chuck body having a plurality of jaws slidable thereon, said body including a power cylinder, a piston in said cylinder, and having a sleeve extending therefrom, means of connection between said sleeve and said jaws for moving the latter upon reciprocation of said piston, said cylinder on the outer circumferential surface having a circumferentially extending seat, a pressure fluid ring seated on said seat, the outer circumferential surface on said cylinder and the inner circumferential surface in said ring having passage means always in communication with both ends of said cylinder at opposite sides of said piston, and pressure fluid pipes connected to said passage means, said ring being held against rotation while said chuck body including said cylinder rotates.

4. In the combination defined in claim 3, and a hood completely surrounding said cylinder and pressure fluid connection means and held against rotation, said hood having a packed sealing joint with said chuck body, and having a drain opening in the lower part thereof.

References Cited in the file of this patent
UNITED STATES PATENTS

| 1,406,451 | Elvers | Feb. 14, 1922 |
| 1,613,090 | Fornaca | Jan. 4, 1927 |
| 1,925,109 | Olson | Sept. 5, 1933 |
| 2,573,403 | Church | Oct. 30, 1951 |
| 2,784,002 | Stace | Mar. 5, 1957 |